(12) United States Patent
Komori (10) Patent No.: US 8,794,842 B2
(45) Date of Patent: Aug. 5, 2014

(54) WHEEL BEARING APPARATUS FOR A VEHICLE

(75) Inventor: Kazuo Komori, Iwata (JP)

(73) Assignee: NTN Corporation, Osaka-shi (JP)

( * ) Notice: Subject to any disclaimer, the term of this patent is extended or adjusted under 35 U.S.C. 154(b) by 102 days.

(21) Appl. No.: 12/491,343

(22) Filed: Jun. 25, 2009

(65) Prior Publication Data

US 2009/0263063 A1 Oct. 22, 2009

Related U.S. Application Data

(63) Continuation of application No. PCT/JP2007/001472, filed on Dec. 26, 2007.

(30) Foreign Application Priority Data

Dec. 27, 2006 (JP) ................................ 2006-352663
Feb. 22, 2007 (JP) ................................ 2007-042184

(51) Int. Cl.
  F16C 33/76 (2006.01)
  F16C 13/00 (2006.01)
  F16C 35/067 (2006.01)
  F16C 41/00 (2006.01)
  F16J 15/32 (2006.01)
  F16C 33/78 (2006.01)
  F16C 19/18 (2006.01)

(52) U.S. Cl.
  CPC ............. *F16C 41/007* (2013.01); *F16C 35/067* (2013.01); *F16C 2326/02* (2013.01); *F16J 15/3264* (2013.01); *F16C 33/7883* (2013.01); *F16C 19/186* (2013.01); *F16C 33/768* (2013.01); *F16C 33/783* (2013.01)
  USPC .......................................... 384/485; 384/544

(58) Field of Classification Search
  USPC .................. 384/477, 478, 484, 485, 544, 589
  See application file for complete search history.

(56) References Cited

U.S. PATENT DOCUMENTS 6,464,399 B1 10/2002 Novak, Jr. et al.
7,086,784 B2 * 8/2006 Ruetter et al. ................ 384/544

FOREIGN PATENT DOCUMENTS

| EP | 1 242 751 | 2/2004 |
|---|---|---|
| JP | 59-16208 | 1/1984 |
| JP | 2003-056579 | 2/2003 |
| JP | 2003-523492 | 8/2003 |
| JP | 2004-162744 | 6/2004 |
| WO | WO 01/48390 | 7/2001 |

* cited by examiner

*Primary Examiner* — Troy Chambers
*Assistant Examiner* — Gregory Prather
(74) *Attorney, Agent, or Firm* — Harness, Dickey & Pierce, P.L.C.

(57) ABSTRACT

A vehicle wheel bearing apparatus has an outer member, an inner member with a wheel hub and an inner ring. Double row rolling elements are freely rollably contained between the inner and outer raceway surfaces, respectively, of the inner member and the outer member. Seals are mounted in annular openings formed between the outer member and the inner member. The inner side seal of these seals comprises an annular slinger and an annular sealing plate. The sealing plate includes a steel plate metal core and a sealing member bonded to the metal core, via vulcanized adhesion. A plurality of sealing lips extends from the sealing member and is in sliding contact with the slinger. An outer circumferential lip is formed on the periphery of the sealing member. The outer circumferential lip extends radially outward. It has a substantially L-shaped cross-section and is adapted to fit into a gap between the outer member and a flange portion of a knuckle. An apex of the outer circumferential lip abuts against the flange portion of the knuckle with a predetermined engaging allowance.

5 Claims, 8 Drawing Sheets

WHEEL BEARING APPARATUS FOR A VEHICLE

CROSS-REFERENCE TO RELATED APPLICATIONS

This application is a continuation of International Application No. PCT/JP2007/001472, filed Dec. 26, 2007, which claims priority to Japanese Application Nos. 2006-352663, filed Dec. 27, 2006 and 2007-042184, filed Feb. 22, 2007. The disclosures of the above applications are incorporated herein by reference.

FIELD

The present disclosure relates to a wheel bearing apparatus to freely rotationally support a wheel of a vehicle and, more particularly, to a wheel bearing apparatus that is intended to improve the sealability between an outer member and a knuckle to prevent the generation of corrosion of the wheel bearing apparatus.

BACKGROUND

Wheel bearing apparatus is used to freely rotationally support a wheel hub to mount a wheel via a double row rolling bearing for a driving wheel type and a driven wheel type. For structural reasons, an inner ring rotation type is adopted for a driving wheel and both inner ring rotation type and outer ring rotation type are adopted for a driven wheel. The wheel bearing apparatus structure is broadly classified into a first through fourth generation type. A first generation type has a wheel bearing with a double row angular contact ball bearing fit between a knuckle, forming part of a suspension, and a wheel hub. A second generation type has a body mounting flange or a wheel mounting flange directly formed on the outer circumference of an outer member. A third generation type has one of the inner raceway surfaces directly formed on the outer circumference of the wheel hub. A fourth generation type has the inner raceway surfaces directly formed on the outer circumferences of the wheel hub and the constant velocity universal joint.

The wheel bearing apparatus is provided with seals to prevent leakage of grease contained within the bearing apparatus and the entry of rain water or dust from outside of the bearing. It is desired that the bearings have a long life due to the maintenance-free tendency of an automobile. Under the circumstances, it has been proved that many troubles are causes based on the bearing seals rather than on peeling or breakage of mechanical parts. Accordingly, it is very important to improve the sealability of the bearing apparatus to extend its life.

Figure 6:
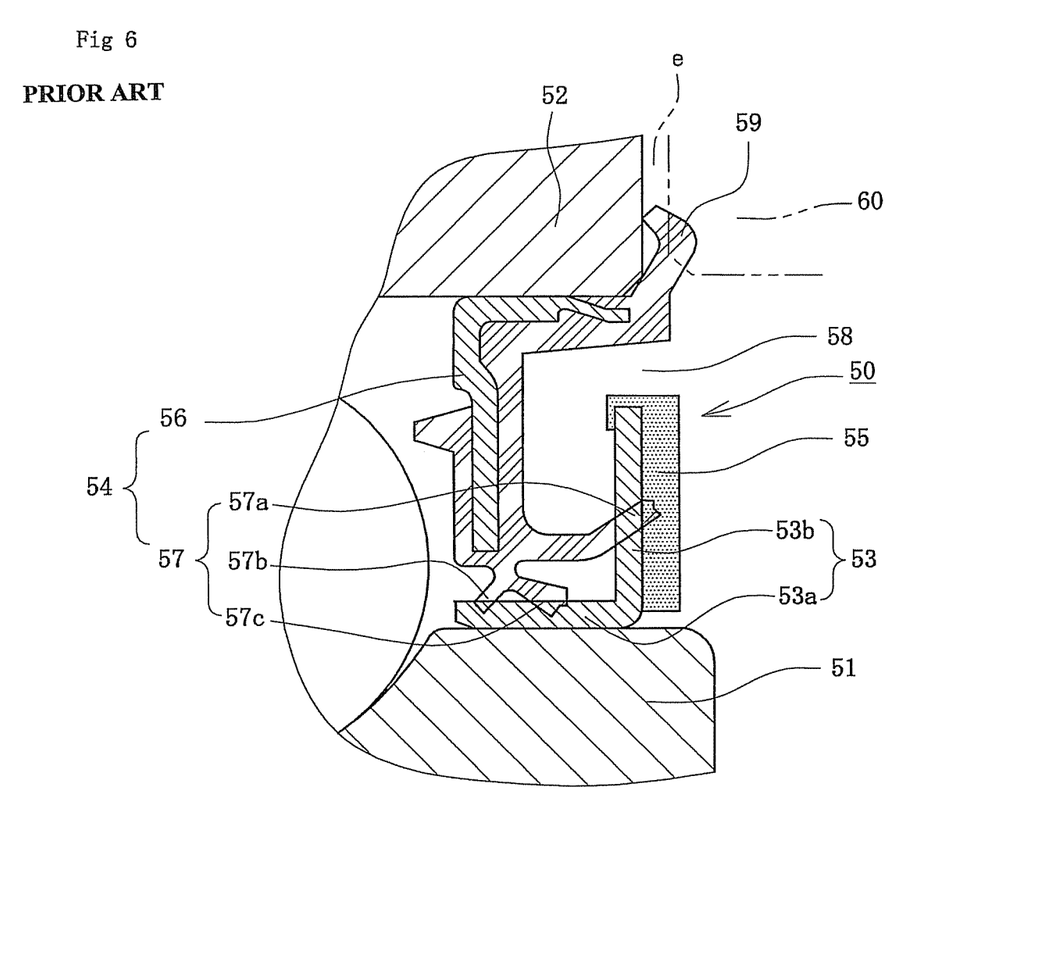
FIG. 6 is a longitudinal section view of a seal of a prior art vehicle wheel bearing apparatus.

Several types of seals that improve sealability have been proposed. One representative example is shown in FIG. 6. This seal 50 has an annular slinger 53 and an annular sealing plate 54 mounted on an inner ring 51 and an outer member 52, respectively. They are arranged opposite toward each other and each of them has a substantially L-shaped cross-section.

The slinger 53 is formed by pressing a steel plate. It includes a cylindrical portion 53a and a standing portion 53b standing from the cylindrical portion 53a. A magnetic encoder 55, made of a rubber magnet, is bonded to the side surface of the standing portion 53b by vulcanized adhesion. The magnetic encoder 55 has N and S poles alternately arranged along its circumference and constructs a rotary encoder to detect wheel speed.

On the other hand, the sealing plate 54 includes a metal core 56 formed by pressing a steel plate. It is press fit into the outer member 52. A sealing member 57 is integrally bonded to the metal core 56 via vulcanized adhesion. The sealing member 57 is made of elastic material such as rubber or synthetic resin and has a side lip 57a, slidingly contacting the standing portion 53b of the slinger 53, and a pair of radial lips 57b, 57c, slidingly contacting the cylindrical portion 53a of the slinger 53. The outer circumference of the sealing member 57 and the standing portion 53b of the slinger 53 are opposite each other via a slight radial gap between the two to form a labyrinth seal 58.

A projected lip 59 is formed on and extends radially outward from the outer circumference of the sealing member 57. The projected lip 59 is formed with an "L" shaped cross-sectional configuration and is adapted to be arranged in a gap "e" between the outer member 52 and the knuckle 60. The lip 59 prevents rain water or muddy water from entering into the bearing through the gap "e" to prevent the generation of corrosion of the bearing. (Japanese Laid-open Patent Publication No. 56579/2003).

Figure 7:
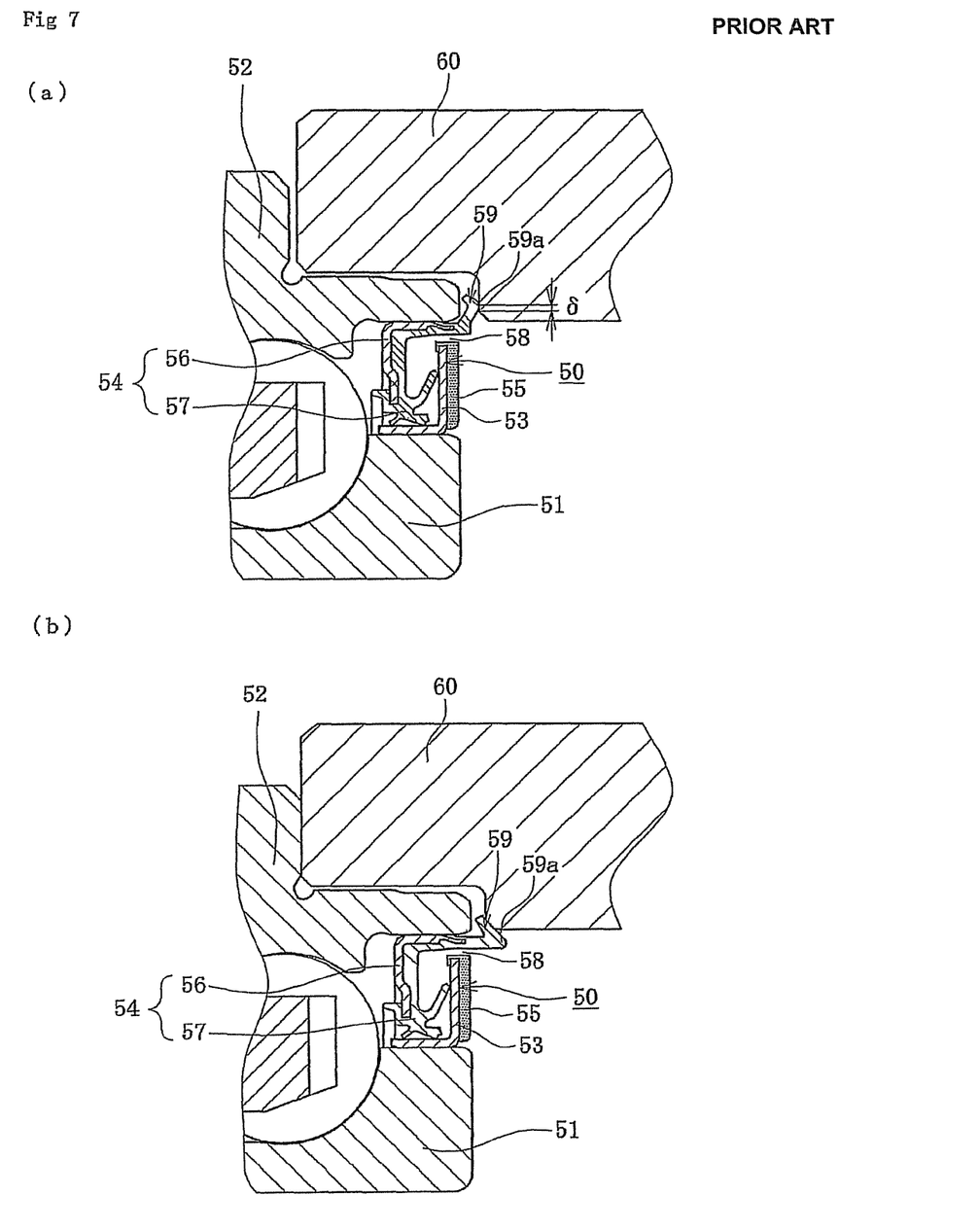
FIG. 7(a) is an explanatory view of a condition during assembly of a knuckle.
FIG. 7(b) is an explanatory view of a condition after assembly of a knuckle.

In such a prior art seal 50, when the engagement allowance δ between a lip apex 59a of the projected lip 59 is small, as shown in FIG. 7(a), the projected lip 59 is pressed out radially inward of the knuckle 60 after the knuckle 60 has been assembled as shown in FIG. 7(b) if the lip apex 59a is not positioned at an appropriate position. This causes a gap between the outer member 52 and the projected lip 59. Thus, it is not only impossible to assure the sealability between the outer member 52 and the knuckle 60 but it is possible that the projected lip 59 would be damaged.

Figure 8:
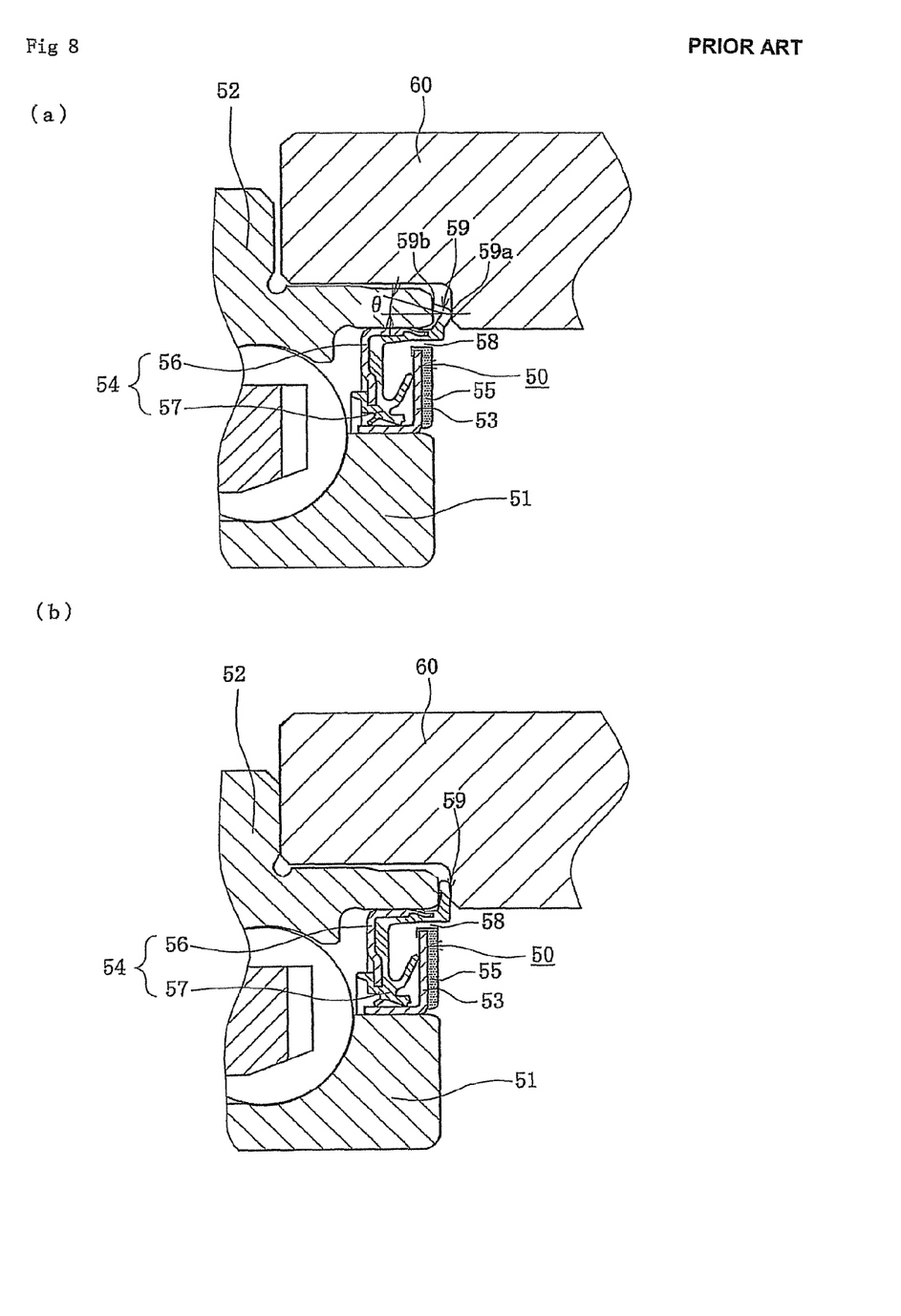
FIG. 8(a) is an explanatory view of a condition during assembly of a knuckle.
FIG. 8(b) is an explanatory view of a condition after assembly of a knuckle.

In addition as shown in FIG. 8(a), the projected lip 59 may not surely contact the knuckle 60 and the outer member 52 at its two points, i.e. at the lip apex 59a and the lip tip 59b if a bent angle θ is not set at an appropriate value. If so, the projected lip 59 would be collapsed and not spread between the end face of the outer member 52 and the knuckle 60 during the assembly of the knuckle 60 is assembled as shown in FIG. 8(b). Thus sealability between the outer member 52 and the knuckle 60 would not be assured.

SUMMARY

It is, therefore, an object of the present disclosure to provide a vehicle wheel bearing apparatus that can improve sealability between the outer member and knuckle to prevent the generation of corrosion in the wheel bearing apparatus.

To achieve the object, a vehicle wheel bearing apparatus comprises an outer member formed, on its inner circumference, with double row outer raceway surfaces. An inner member includes a wheel hub and an inner ring. The wheel hub has at its one end an integrally formed wheel mounting flange on its outer circumference. The wheel hub has an axially extending cylindrical portion. The inner ring is fit onto the cylindrical portion of the wheel hub, via a predetermined interference. The inner member is formed on its outer circumference with double row inner raceway surfaces that are arranged opposite to the double row outer raceway surfaces. Double row rolling elements are freely rollably contained between the inner and outer raceway surfaces, respectively, of the inner member and the outer member. Seals are mounted in annular openings formed between the outer member and the inner member. The inner side seal of these seals includes an annular slinger and an annular sealing plate press fit onto the inner member and the outer member. They are arranged opposite toward each other and each one has a substantially L-shaped cross-section. The sealing plate includes a steel plate metal core and a sealing member bonded to the metal core via vulcanized adhesion. A plurality of sealing lips slidingly contacts the slinger. An outer circumferential lip is formed on the periphery of the sealing member. The outer circumferential lip extends radially outward. The outer circumferential lip has a substantially L-shaped cross-section and is adapted to be fit into a gap between the outer member and a flange portion of a knuckle. An apex of the outer circumferential lip has a diameter set at a predetermined value. The apex is abutted against the flange portion of the knuckle with a predetermined engaging allowance.

The wheel bearing apparatus comprises seals mounted in annular openings formed between the outer member and the inner member. The inner side seal of these seals comprises an annular slinger and an annular sealing plate press fit onto the inner member and the outer member so that they are arranged opposite toward each other. Each one has a substantially L-shaped cross-section. The sealing plate includes a steel plate metal core and a sealing member bonded to the metal core via vulcanized adhesion. The sealing member has a plurality of sealing lips slide-contacting the slinger. An outer circumferential lip is formed on the periphery of the sealing member. The outer circumferential lip extends radially outward. It has a substantially L-shaped cross-section and is adapted to be fit into a gap between the outer member and a flange portion of a knuckle. An apex of the outer circumferential lip has a diameter set at a predetermined value. The apex abuts against the flange portion of the knuckle with a predetermined engaging allowance. Thus, it is possible to prevent the press-out of the outer circumferential lip after assembly of the knuckle. This assures the sealability between the outer member and the knuckle. In addition, this also makes it possible to prevent the outer circumferential lip from being damaged. Also, it prevents the entry of rain water or muddy water. Accordingly, it is possible to improve the sealability between the outer member and the knuckle to prevent the generation of corrosion within the wheel bearing.

It is preferable that the engaging allowance is set at a value of ω0.1 or more. This makes it possible to surely prevent the press-out of the outer circumferential lip from the knuckle.

The lip apex of the outer circumferential lip abuts against the flange portion of the knuckle while keeping a predetermined axial gap between a tip of the outer circumferential lip and an end face of the outer member, during assembly of the knuckle. This makes it possible to assure the sealability between the outer member and the knuckle while keeping a desired interface between the two.

A chamfered portion is formed on an inner circumferential corner of the flange of the knuckle. The diameter of the lip apex is set larger than an outer diameter of the chamfered portion. This prevents the outer circumferential lip from being damaged during assembly of the knuckle.

The sealing member is secured on an outer circumferential surface of a cylindrical portion of the metal core while surrounding the edge of the cylindrical portion. The sealing member is adapted to be in intimate contacted with a portion fit into the outer member. This makes it possible to improve the sealability in the seal fitting portion.

A bent angle of the outer circumferential lip is set at an angle 10° or more relative to a vertical line to the end face of the outer member. Two points of the outer circumferential lip 17, the tip and the lip apex, elastically contact the end face of the outer member and the flange portion of the knuckle, respectively, when the tip contacts the end face of the outer member during the assembly of the knuckle. This makes it possible to assure sealability between the outer member and the knuckle. In addition, this also makes it possible to prevent the outer circumferential lip from being damaged. Thus, it prevents entry of rain water or muddy water. Accordingly, it is possible to improve sealability between the outer member and the knuckle to further prevent the generation of corrosion within the wheel bearing.

The vehicle wheel bearing apparatus comprises an outer member formed, on its inner circumference, with double row outer raceway surfaces. An inner member includes a wheel hub and an inner ring. The wheel hub has at its one end an integrally formed wheel mounting flange on its outer circumference and an axially extending cylindrical portion. The inner ring is fit onto the cylindrical portion of the wheel hub, via a predetermined interference. The inner member is formed on its outer circumference, with double row inner raceway surfaces that are arranged opposite to the double row outer raceway surfaces. Double row rolling elements are freely rollably contained between the inner and outer raceway surfaces, respectively, of the inner member and the outer member. Seals are mounted in annular openings formed between the outer member and the inner member. The inner side seal of these seals includes an annular slinger and an annular sealing plate press fit onto the inner member and the outer member so that they are arranged opposite toward each other. Each one has a substantially L-shaped cross-section. The sealing plate includes a steel plate metal core and a sealing member bonded to the metal core via vulcanized adhesion. The sealing member has a plurality of sealing lips in sliding contact with the slinger. An outer circumferential lip is formed on the periphery of the sealing member. The outer circumferential lip extends radially outward. It has a substantially L-shaped cross-section and is adapted to be fit into a gap between the outer member and a flange portion of a knuckle. An apex of the outer circumferential lip has a diameter set at a predetermined value. The apex abuts against the flange portion of the knuckle with predetermined engaging allowance. Thus, it is possible to prevent the press-out of the outer circumferential lip after assembly of the knuckle. This assures the sealability between the outer member and the knuckle. In addition, this also makes it possible to prevent the outer circumferential lip from being damaged. Thus, this prevents entry of rain water or muddy water. Accordingly, it is possible to improve the sealability between the outer member and the knuckle to prevent the generation of corrosion within the wheel bearing.

A vehicle wheel bearing apparatus comprises an outer member formed, on its outer circumference, with a body mounting flange adapted to be mounted on a knuckle. Its inner circumference includes double row outer raceway surfaces. An inner member includes a wheel hub and an inner ring. The wheel hub has at its one end an integrally formed wheel mounting flange. Its outer circumference includes an inner raceway surface opposite to one of the double row outer raceway surfaces. A cylindrical portion extends axially from the inner raceway surface. The inner ring is fit onto the cylindrical portion of the wheel hub. The inner ring outer circumference includes an inner raceway surface opposite to the other of the double row outer raceway surfaces. Double row rolling elements are freely rollably contained between the inner and outer raceway surfaces, respectively, of the inner member and the outer member. Seals are mounted in annular openings formed between the outer member and the inner member. The inner side seal of these seals includes an annular slinger and an annular sealing plate press fit onto the inner member and the outer member so that they are arranged opposite toward each other. Each one has a substantially L-shaped cross-section. The sealing plate includes a steel plate metal core and a sealing member bonded to the metal core, via vulcanized adhesion. The sealing member has a plurality of sealing lips in sliding contact with the slinger. An outer circumferential lip is formed on the periphery of the sealing member. The outer circumferential lip extends radially outward. It has a substantially L-shaped cross-section and is adapted to be fit into a gap between the outer member and a flange portion of a knuckle. The diameter of a lip apex of the outer circumferential lip is set larger than an outer diameter of the chamfered portion of the flange portion. The lip apex abuts against the flange portion with the engaging allowance larger than ω0.1 or more.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A preferred embodiment of the present disclosure will be hereinafter described with reference to the drawings.

Figure 1:
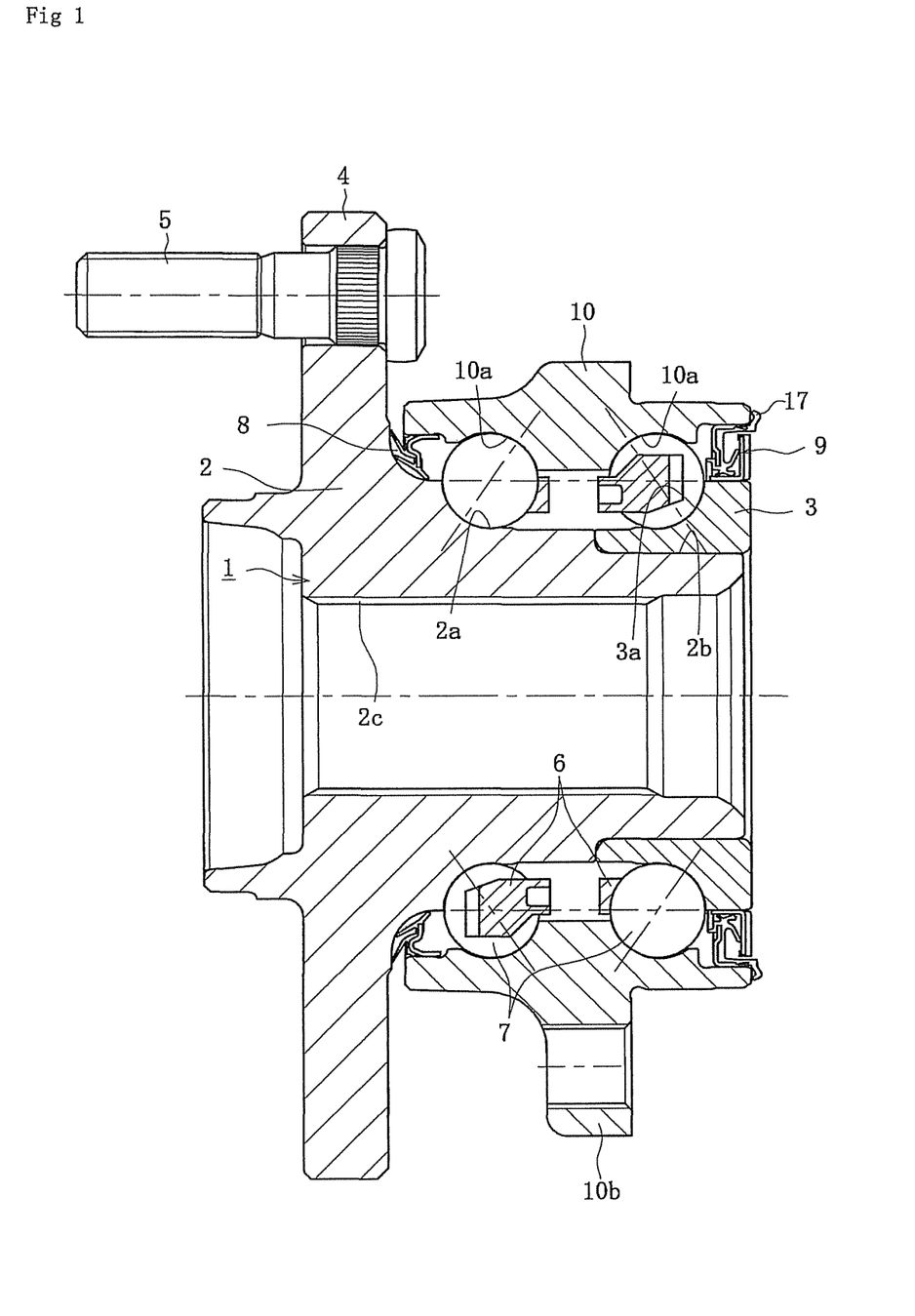
FIG. 1 is a longitudinal section view of one embodiment of a vehicle wheel bearing apparatus.
Figure 2:
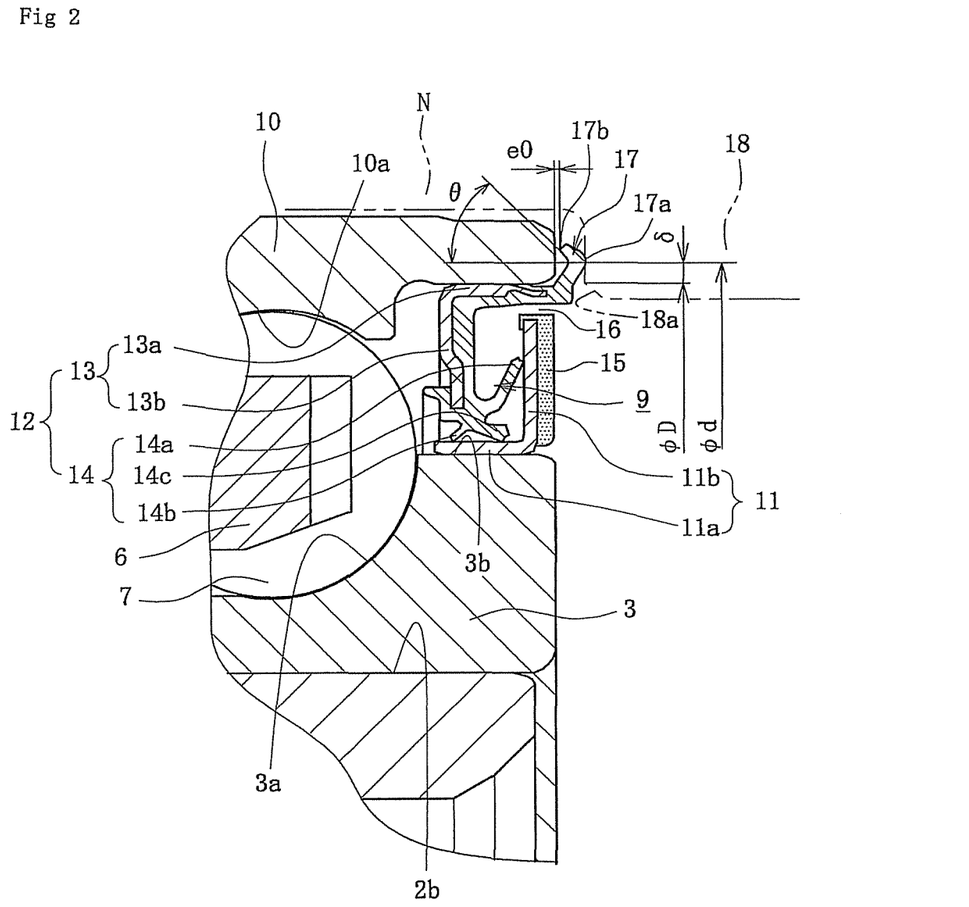
FIG. 2 is a partially enlarged longitudinal view of FIG. 1.
Figure 3:
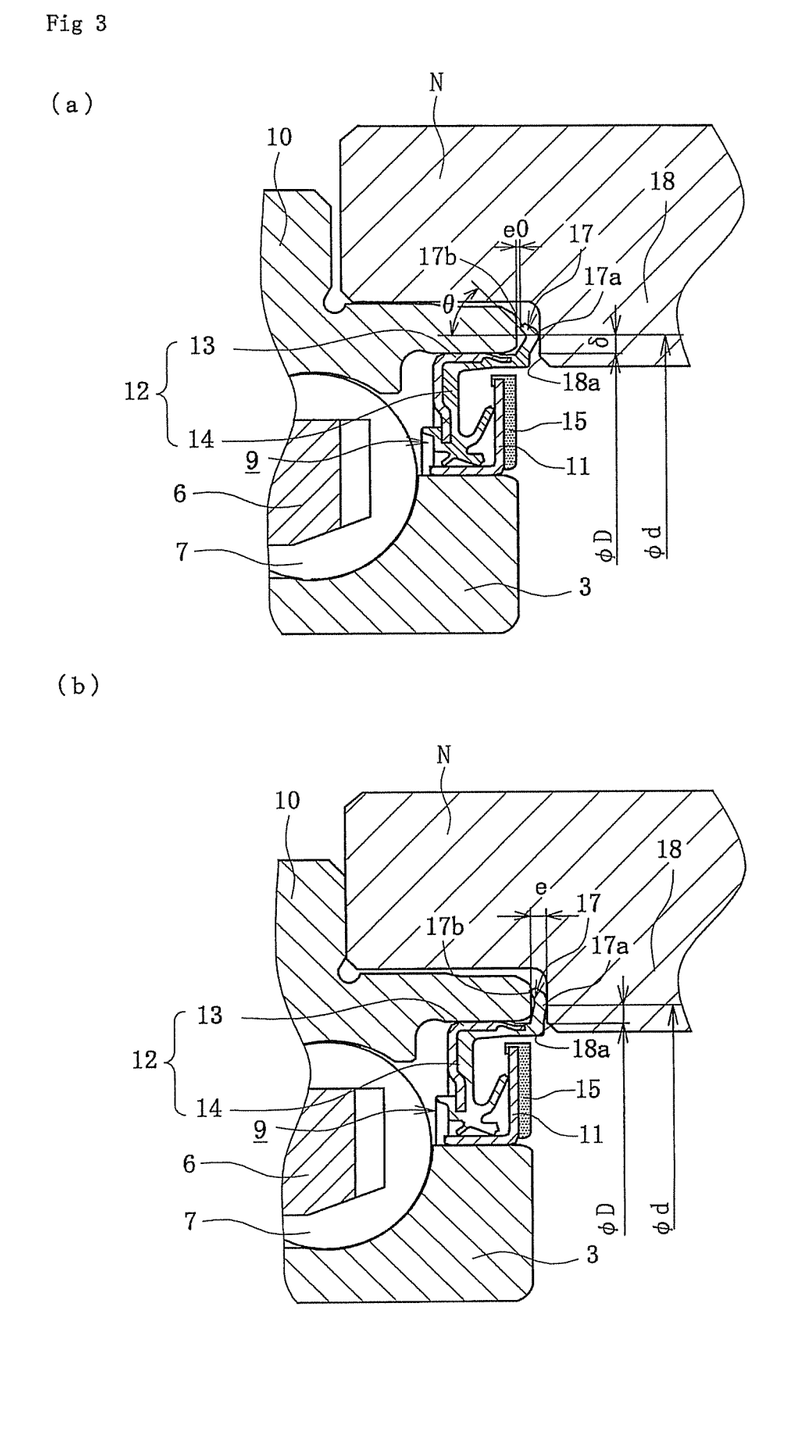
FIG. 3(a) is an explanatory view of a condition during assembly of a knuckle.
FIG. 3(b) is an explanatory view of a condition after assembly of a knuckle.
Figure 4:
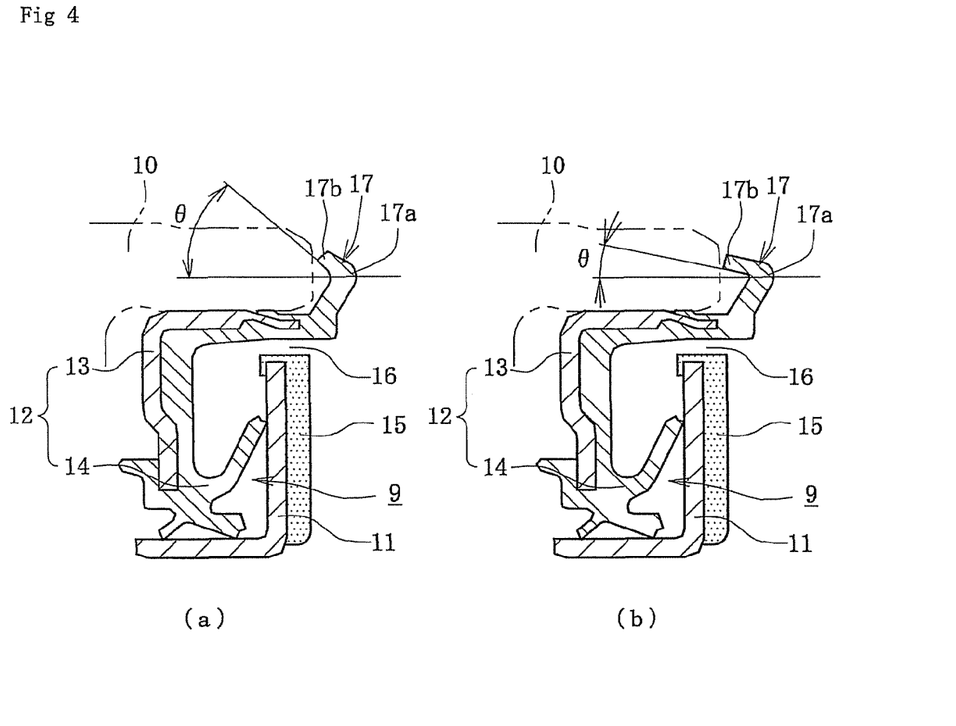
FIG. 4(a) is an enlarged view of the seal of FIG. 3.
FIG. 4(b) is an enlarged view of a comparative example of FIG. 4(a).
Figure 5:
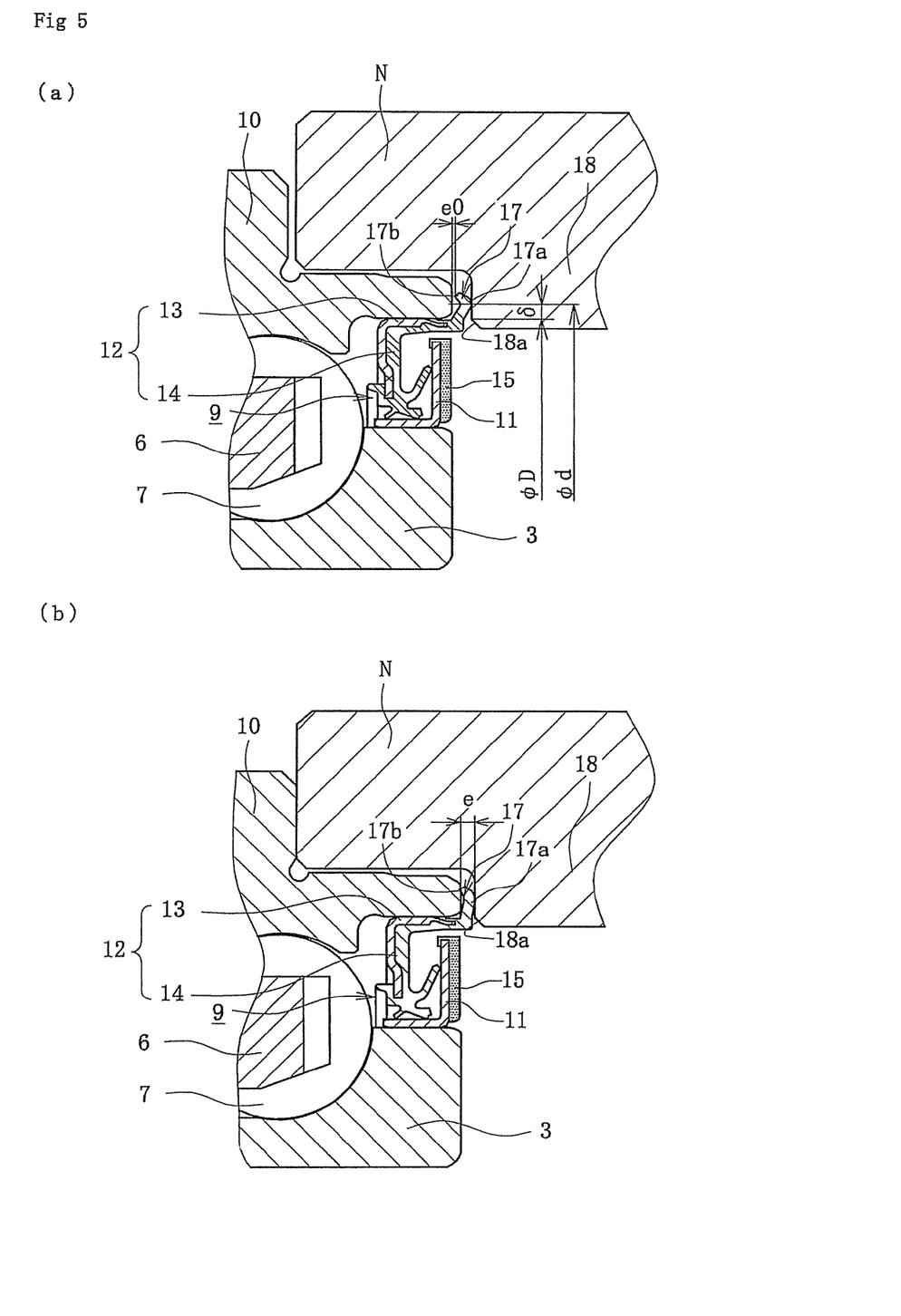
FIG. 5(a) is an explanatory view of a condition during assembly of a knuckle.
FIG. 5(b) is an explanatory view of a condition after assembly of a knuckle.

FIG. 1 is a longitudinal section view of one embodiment of the vehicle wheel bearing apparatus. FIG. 2 is a partially enlarged longitudinal view of FIG. 1. FIG. 3(a) is an explanatory view showing a condition during assembly of a knuckle. FIG. 3(b) is an explanatory view showing a condition after assembly of a knuckle. FIG. 4(a) is an enlarged view of the seal of FIG. 3. FIG. 4(b) is an enlarged view of a comparative example of FIG. 4(a). FIG. 5(a) is an explanatory view of a condition during assembly of a knuckle. FIG. 5(b) is an explanatory view of a condition after assembly of a knuckle. In the description below, the outer side of the wheel bearing apparatus when it is mounted on a vehicle is referred to as the "outer side" (a left side in FIG. 1). The inner side of the wheel bearing apparatus is referred to as the "inner side" (a right side in FIG. 1).

The wheel bearing apparatus shown in FIG. 1 is a third generation type used for a driving wheel. It includes an inner member 1, an outer member 10, and a plurality of balls 7, 7 freely rollably contained between the inner and outer members 1, 10. The inner member 1 has a wheel hub 2 and an inner ring 3 press fit onto the wheel hub 2, via a predetermined interference.

The wheel hub 2 is integrally formed with a wheel mounting flange 4 at its one end. One (outer side) inner raceway surface 2a is formed on the wheel hub 2. A cylindrical portion 2b extends from the inner raceway surface 2a. Hub bolts 5 are arranged on the wheel mounting flange 4 equidistantly along its periphery. The inner ring 3 is formed, on its outer circumference, with another (inner side) inner raceway surface 3a. The inner ring 3 is fit onto the cylindrical portion 2b via a predetermined interface.

The wheel hub 2 is made of medium carbon steel including carbon of 0.40~0.80% by weight such as S53C. It is hardened by high frequency induction quenching. Thus, a region from a base of the wheel mounting flange 4, forming a seal land of the seal of the outer side, including the inner raceway surface 2a to the cylindrical portion 2b has a hardness of 58~64 HRC. The inner ring 3 and the rolling elements (balls) 7 are made of high carbon chrome steel such as SUJ2. They are hardened to their core by dip quenching to have a surface hardness of 58~64 HRC.

The outer member 10 is integrally formed on its outer circumference with a body mounting flange 10b. The body mounting flange 10b is to be mounted on a knuckle (not shown) of a vehicle. The outer member inner circumference includes double row outer raceway surfaces 10a, 10a positioned opposite to the inner raceway surfaces 2a, 3a of the inner member 1. A plurality of rolling elements (balls) 7, 7 are freely rollably contained via cages 6 between the raceway surfaces 10a, 10a; 2a, 3a. The outer member 10 is made of medium carbon steel including carbon of 0.40~0.80% by weight such as S53C. At least the double row outer raceway surfaces 10a, 10a are hardened by high frequency induction quenching to have a surface hardness of 58~64 HRC.

Seals 8, 9 are mounted within annular openings formed between the outer member 10 and inner member 1 to prevent leakage of grease contained in the bearing and the entry of rain water and dust into the bearing from the outside.

As shown in an enlarged view of FIG. 2, the inner side seal 9 of the seals 8, 9 is formed of a so-called "hi-pack seal". The seal 9 has an annular slinger 11 and sealing plate 12 arranged opposite toward each other. The slinger 11 is formed by pressing a ferromagnetic steel plate such as ferritic stainless steel sheet (JIS SUS 430 etc.) or preserved cold rolled sheet (JIS SPCC etc.). It is pressed into a generally annular configuration with a substantially L-shaped cross-section. The slinger includes a cylindrical portion 11a fit onto the inner ring 3 and a standing portion 11b that extends radially outward from the cylindrical portion 11a. This prevents the generation of corrosion of the slinger 11 and improves the durability of the seal 9.

A magnetic encoder 15, formed of elastomer such as rubber mingled with magnetic powder such as ferrite, is integrally bonded via vulcanized adhesion to an inner side surface of the standing portion 11b. The magnetic encoder 15 has N and S poles alternately arranged along its circumference. The encoder constructs a rotary encoder to detect the wheel speed.

The sealing plate 12 comprises a metal core 13 including a cylindrical portion 13a fit into the end of the outer member 10. A standing portion 13b extends radially inward from the cylindrical portion 13a. A sealing member 14 is bonded to the metal core 13 via vulcanized adhesion. The metal core 13 is press-formed of an austenitic stainless steel sheet (JIS SUS 304 etc.) or a preserved cold rolled sheet (JIS SPCC etc.).

The sealing member 14 is formed from an elastic member such as nitrile rubber. The sealing member 14 includes a side lip 14a in sliding contact with the standing portion 11b of the slinger 11. Radial lips 14b, 14c are in sliding contact with the cylindrical portion 11a of the slinger 11. The side lip 14a is formed with an inclined cross-section radially outward from the standing portion 13b of the metal core 13. The tip of the side lip 14a slidingly contacts the standing portion 11b of the slinger 11, via a predetermined interface. The outer circumferential edge of the standing portion 11b of the slinger 11 and the outer circumference of the sealing member 14 are opposed toward each other, via a slight radial gap, to form a labyrinth seal 16. The seal 16 improves the sealability to prevent rain water or dust from directly entering onto the side lip 14a from the outside.

The sealing member 14 is secured on an outer circumferential surface of a cylindrical portion 13a of the metal core 13 while surrounding the edge of the cylindrical portion 13a. The sealing member 14 is adapted to be in intimate contact with a portion fit into the outer member 10 to improve the sealability. An outer circumferential lip 17 with an L-shaped cross-section extends radially outward from the outer circumference of the sealing member 14. The outer circumferential lip 17 has a substantially L-shaped cross-section and is adapted to be fit into a gap "e" between the outer member 10 and a flange portion 18 of the knuckle N. In addition, a diameter $\phi d$ of the lip apex 17a is set at a predetermined value (see FIG. 3(b)). That is, as shown in FIG. 3(a), the diameter "$\phi d$" of the lip apex 17a is set so that an engaging allowance $2\delta$ between the lip apex 17a and the knuckle N is larger than a predetermined value under a condition where there is a predetermined axial gap "e0" between the tip 17b of the outer circumferential lip 17 and the end face of the outer member 10 during assembly of the knuckle N.

Results of examination of a fitting test carried out by the applicants of the present application is shown in Table 1 below. The tip 17b of the outer circumferential lip 17 and the lip apex 17a abut against the end face of the outer member 10 and the flange portion 18 of the knuckle N, respectively, after assembly of the knuckle N as shown in FIG. 3(b). The diameter $\omega d$ of the lip apex 17a of the outer circumferential lip 17 is set larger than by $\omega 0.1$ or more, the diameter "$\omega D$" of the chamfered portion 18a of an inner circumferential corner of the flange 18 of the knuckle N. Thus, the press-out of the outer circumferential lip 17 can be surely prevented. Accordingly it is possible to assure the sealability between the outer member and the knuckle. In addition, this also makes it possible to prevent the outer circumferential lip from being damaged. Thus, this prevents entry of rain water or muddy water. Thus, it is possible to improve sealability between the outer member and the knuckle to prevent the generation of corrosion within the wheel bearing.

TABLE 1

| Diameter of lip apex ($\phi d$) | Diameter of chamfered portion ($\phi D$) | Engaging allowance $2\delta(d - D)$ | Press-out of lip |
|---|---|---|---|
| $\phi 70.82$ | $\phi 71.32$ | −0.50 | presence |
| $\phi 70.13$ | $\phi 71.32$ | −0.19 | presence |
| $\phi 70.29$ | $\phi 71.32$ | −0.03 | presence |
| $\phi 70.35$ | $\phi 71.32$ | +0.03 | presence |
| $\phi 70.82$ | $\phi 70.73$ | +0.09 | none |

In addition, it is possible that the tip 17b of the projected lip (outer circumferential tip) 17 would be inverted radially inward without being spread radially outward when the tip 17b is contacted with the end face of the outer member at an angle near 90° relative to the end face as shown in FIG. 4(b). The applicant of the present application has discovered the bent angle θ of the projected lip 17 and found that the tip 17b of the projected lip 17 can be surely spread radially outward during assembly of the knuckle N by setting the bent angle θ at 10° or more, preferably 15° or more, relative to a normal line to the end face of the outer member 10, as shown in FIG. 4(a). Thus it is possible that two points of the outer circumferential lip 17, the tip 17b and the lip apex 17a, elastically contact the end face of the outer member 10 and the flange portion 18 of the knuckle N, respectively, under a condition of predetermined interference, as shown in FIG. 5(b). Accordingly, it is possible to assure the sealability between the outer member 10 and the knuckle N. In addition, this also makes it possible to prevent the outer circumferential lip from being damaged. Thus, this prevents entry of rain water or muddy water. Thus, it is possible to improve the sealability between the outer member and the knuckle to prevent the generation of corrosion within the wheel bearing.

Although the illustrated embodiment is shown using a double row angular contact ball bearing using balls as rolling elements 7, the present disclosure is not limited to such an illustrated embodiment. A double row tapered roller bearing using tapered rollers as rolling elements 7 may be used. In addition, although the illustrated embodiment is shown as a third generation type, with the inner raceway surface 2a directly formed on the outer circumference of the wheel hub 2, it is possible to apply the present disclosure to other types of wheel bearings such as the first or second generation type where a pair of inner rings are press fit onto a cylindrical portion of a wheel hub.

The wheel bearing apparatus can be applied to wheel bearing apparatus of the first, second and third generation type using a hi-pack seal as an inner side seal.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A vehicle wheel bearing apparatus comprising:
an outer member formed, on its inner circumference, with double row outer raceway surfaces;
an inner member including a wheel hub and an inner ring, the wheel hub having at its one end an integrally formed wheel mounting flange, said wheel hub including an axially extending cylindrical portion, and the inner ring being fit onto the cylindrical portion of the wheel hub via a predetermined interference, the inner member outer circumference including double row inner raceway surfaces arranged opposite to the double row outer raceway surfaces;
double row rolling elements freely rollably contained between the inner and outer raceway surfaces, respectively, of the inner member and the outer member;
seals mounted in annular openings formed between the outer member and the inner member;
the inner side seal of said seals comprises an annular slinger and an annular sealing plate press fit onto the inner member and the outer member so that they are arranged opposite toward each other, each of them having a substantially L-shaped cross-section, the sealing plate including a steel plate metal core and a sealing member bonded to the metal core, via vulcanized adhesion, said sealing member including a plurality of sealing lips in sliding contact with the slinger;

an outer circumferential lip is formed on a periphery of the sealing member, said outer circumferential lip extends radially outward and has a substantially L-shaped cross-section, said outer circumferential lip adapted to be fit into a gap between the outer member and a flange portion of a knuckle, and an apex of the outer circumferential lip has a diameter (d), the apex outer circumferential lip diameter (d) is larger than, by 0.1 mm or more, a diameter (D) of a chamfered portion of an inner circumferential corner flange of the knuckle thus preventing press-out of the outer circumferential lip;

prior to assembly, said apex abuts against the flange portion of the knuckle with a predetermined engaging allowance δ, the engaging allowance δ between the lip apex and the knuckle is larger than a predetermined value under a condition where there is a predetermined axial gap (e0) between a tip of the outer circumferential lip and the end face of the outer member;

after assembly, the circumferential lip is fit into a gap (e) between the outer member and knuckle with only two points of a cross-section of the outer circumferential lip, the tip and lip apex, respectively, abutting and elastically contacting the end face of the outer member and the flange portion of the knuckle, respectively, under a predetermined interference and wherein an axial gap is present radially inward of the tip of the outer circumferential lip between the lip apex and outer member.

2. The vehicle wheel bearing apparatus of claim 1, wherein the engaging allowance (2δ) is set at a value of 0.1 mm or more.

3. The vehicle wheel bearing apparatus of claim 1, wherein a chamfered portion is formed on an inner circumferential corner of the flange of the knuckle, and wherein the diameter of the lip apex is set larger than an outer diameter of the chamfered portion.

4. The vehicle wheel bearing apparatus of claim 1, wherein the sealing member is secured on an outer circumferential surface of a cylindrical portion of the metal core while surrounding edge of the cylindrical portion and adapted to be in intimate contact with a portion of the metal core fit into the outer member.

5. The vehicle wheel bearing apparatus claim 1, wherein a bent angle of the outer circumferential lip is set at an angle 10° or more relative to a vertical line to an end face of the outer member.

* * * * *

UNITED STATES PATENT AND TRADEMARK OFFICE
CERTIFICATE OF CORRECTION

PATENT NO. : 8,794,842 B2  
APPLICATION NO. : 12/491343  
DATED : August 5, 2014  
INVENTOR(S) : Kazuo Komori It is certified that error appears in the above-identified patent and that said Letters Patent is hereby corrected as shown below:

In the Specification

Column 3  
Line 39        "ω0.1" should be --φ0.1--

Column 5  
Line 11        "ω0.1" should be --φ0.1--

Column 7  
Line 44        "ωd" should be --φd--  
Line 45        "ω0.1" should be --φ0.1--  
Line 45        "ωD" should be --φD--

In the Claims

Column 10  
Line 22, claim 5        after "apparatus", insert --of--

Signed and Sealed this  
Second Day of December, 2014

Michelle K. Lee  
*Deputy Director of the United States Patent and Trademark Office*